J. F. SCHURLE.
TRACTOR ATTACHMENT.
APPLICATION FILED JUNE 29, 1920.

1,381,755.

Patented June 14, 1921.

WITNESSES

INVENTOR
J. F. SCHURLE
BY
ATTORNEYS

UNITED STATES PATENT OFFICE.

JOHN FREDERICK SCHURLE, OF CASHMERE, WASHINGTON.

TRACTOR ATTACHMENT.

1,381,755.  Specification of Letters Patent.  Patented June 14, 1921.

Application filed June 29, 1920. Serial No. 392,697.

*To all whom it may concern:*

Be it known that I, JOHN F. SCHURLE, a citizen of the United States, and a resident of Cashmere, in the county of Chelan and State of Washington, have invented a new and Improved Tractor Attachment, of which the following is a full, clear, and exact description.

This invention relates to improvements in tractor attachments, particularly to an attachment for tractors which are adapted to pull plows, ditch diggers, cultivators, etc.

One object of the invention is to provide an improved means for lifting the plows or diggers off the ground when they are not in use.

A further object is to provide a tractor in which the plows are carried directly by the tractor, and to provide hand operative means on the tractor for controlling the position of the plows.

With this and other objects in view, the invention consists of certain features of construction and combination and arrangements of parts, as will be more fully hereinafter described and pointed out in the claims.

In the accompanying drawings:—

I have illustrated a form of tractor which is now in common use, and which is well suited to receive my attachment. A represents the tractor and 1 represents a cross piece forming a part of the rear framework thereof.

Figure 2:
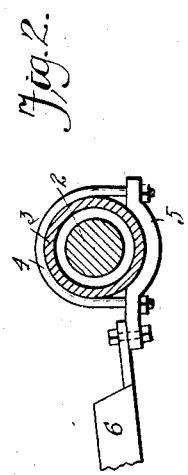
Fig. 2 is a view in section on the line 2—2 of Fig. 1.

The rear axle 2 of the tractor is located in a suitable axle housing 3. Around the axle housing adjacent each wheel inverted U bolts 4 are located. Clips 5 curved in conformity with the curvature of the axle housing 3 are secured to the extremities of the U bolts 4, as shown clearly in Fig. 2.

Bars 6 preferably of angle iron are bolted to the clips 5, and extend rearwardly beyond the rear wheels 7 of the tractor. These bars 6 are supported at their intermediate portion on the cross piece 1. Curved brackets or hangers 9 depend from the ends of the bars 6 and a tubular shaft 8 is supported in the hangers 9, and capable of rotary motion therein.

Plows 10 are secured to the shaft 8 by means of plow beams 11 bolted to the shaft, as shown at 12. A lever 13 is clamped to the shaft 8 in any approved manner so that a movement of the lever causes a rotary movement of the shaft 8.

A notched segment 14 has one end secured to the underface of the crosspiece 1, and its other end secured to one of the bars 6.

A hand-operated catch 15 on the lever coöperates with the segment 14 to lock the lever in any desired position.

The lever 13 is, of course, located near the driver's seat, so that one driving the tractor can conveniently operate the lever.

The operation is as follows:—

Figure 1:
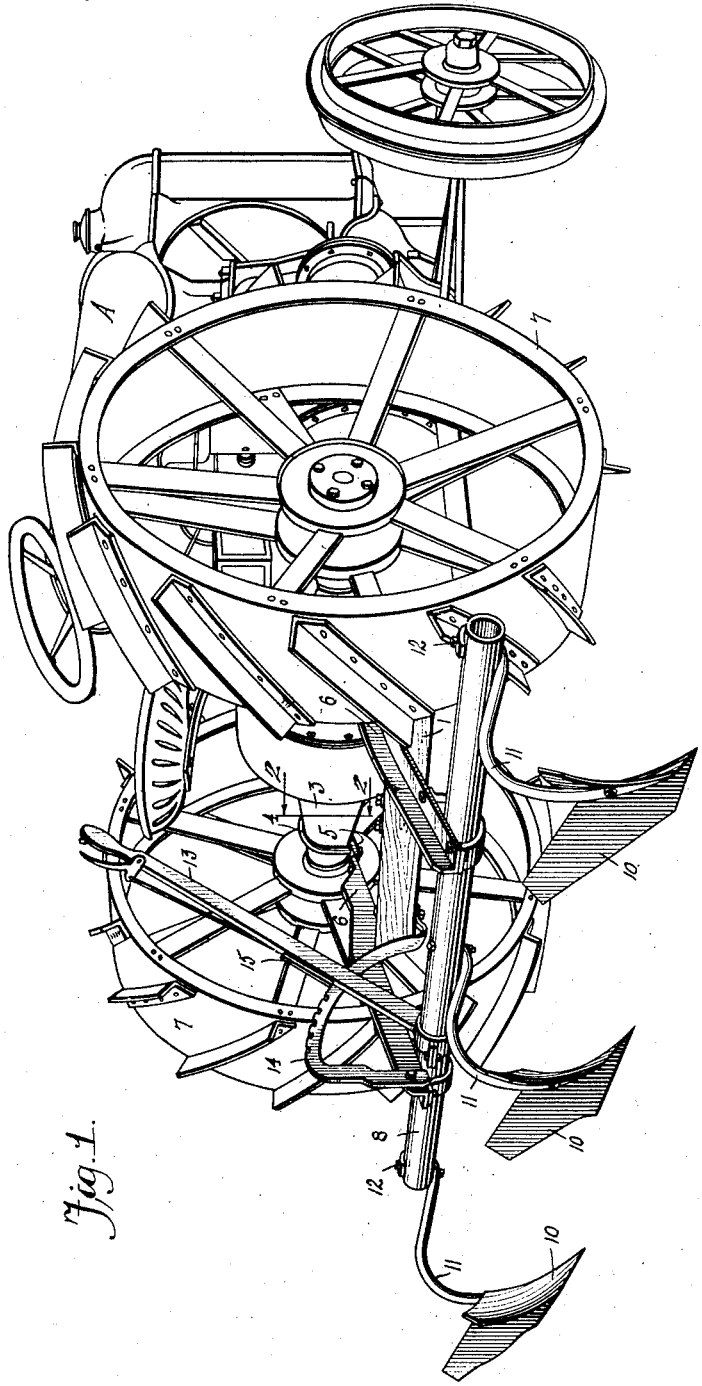
Figure 1 is a perspective view of a tractor with my improved device attached.

When the plows are in the ground and the operator desires to raise them, he grasps the lever 13 and pulls it forwardly, thus partially rotating the shaft 8 and bringing the lever and plows to the position shown in Fig. 1. The catch 15 holds the lever locked to the segment bar in this position until the catch is again released by the operator when the lever will move rearwardly and the plows sink into the ground.

While I have illustrated plows mounted on the shaft, it is obvious that it may be utilized with harrows and other types of agricultural implements. It will also be readily seen that various slight changes and alterations might be made in the general form of the parts described without departing from my invention, and hence, I do not limit myself to the precise details set forth, but consider myself at liberty to make such slight changes and alterations as fairly fall within the spirit and scope of the appended claims.

I claim:

1. The combination with a wheeled supporting frame including a housing around the rear axle and a transverse frame bar located behind the rear axle, of a pair of longitudinal frame bars connected to the axle housing and supported on said transverse frame bar, depending semi-circular hangers secured to the free ends of the longitudinal frame bars, a shaft mounted in the hangers, plows fixedly secured to the shaft, and means for rotating the shaft.

2. The combination with a wheeled supporting frame including a housing around the rear axle and a transverse frame bar located behind the rear axle, of a pair of longitudinal frame bars connected to the axle housing and supported on said transverse frame bar, depending semi-circular hangers secured to the free ends of the longitudinal frame bars, a shaft mounted in the hangers, plows fixedly secured to the shaft, a manually operated lever fixed to the shaft, a notched segment having one end secured to the free end of one longitudinal frame bar and its other end secured to the transverse frame bar, and devices on the lever coöperating with the segment to lock the shaft in various positions.

JOHN FREDERICK SCHURLE.